(12) United States Patent
Chang et al.

(10) Patent No.: US 11,983,522 B2
(45) Date of Patent: May 14, 2024

(54) EDGE-BASED INTELLIGENCE FOR OVER THE AIR UPDATE

(71) Applicant: Ayla Networks, Inc., Santa Clara, CA (US)

(72) Inventors: Yi Chang, Saratoga, CA (US); Yipei Wang, Sunnyvale, CA (US); Sahir Sait, Mountain View, CA (US); Ashish Agrawal, Saratoga, CA (US)

(73) Assignee: Ayla Networks, Inc., Milpitas, CA (US)

( * ) Notice: Subject to any disclaimer, the term of this patent is extended or adjusted under 35 U.S.C. 154(b) by 23 days.

(21) Appl. No.: 17/085,541

(22) Filed: Oct. 30, 2020

(65) Prior Publication Data

US 2022/0137948 A1    May 5, 2022

(51) Int. Cl.
- *G06F 8/65* (2018.01)
- *G06F 11/14* (2006.01)
- *G06N 20/00* (2019.01)
- *H04L 12/28* (2006.01)
- *H04L 67/00* (2022.01)

(52) U.S. Cl.
CPC ............ *G06F 8/65* (2013.01); *G06F 11/1433* (2013.01); *G06N 20/00* (2019.01); *H04L 12/28* (2013.01); *H04L 67/34* (2013.01)

(58) Field of Classification Search
CPC ........ G06F 8/65; G06F 11/1433; H04L 12/28; H04L 64/34
See application file for complete search history.

(56) References Cited

U.S. PATENT DOCUMENTS

| | | | |
|---|---|---|---|
| 8,515,412 B2 | 8/2013 | Choi-Grogan et al. | |
| 10,045,203 B2 | 8/2018 | Chandrasekaran et al. | |
| 10,841,791 B1* | 11/2020 | Zhang | .................. H04W 8/245 |
| 2012/0124570 A1* | 5/2012 | Alberth, Jr. | ............... G06F 8/65 |
| | | | 717/173 |
| 2013/0139138 A1* | 5/2013 | Kakos | ....................... G06F 8/65 |
| | | | 709/224 |
| 2014/0237595 A1* | 8/2014 | Sridhara | ............... G06F 21/566 |
| | | | 709/224 |
| 2014/0304700 A1* | 10/2014 | Kim | .......................... G06F 8/65 |
| | | | 717/173 |
| 2015/0082297 A1* | 3/2015 | Parry | ...................... G06F 8/654 |
| | | | 717/173 |
| 2015/0193223 A1* | 7/2015 | Cardamore | ............... G06F 9/44 |
| | | | 717/170 |

(Continued)

*Primary Examiner* — S. Sough
*Assistant Examiner* — Cheneca Smith
(74) *Attorney, Agent, or Firm* — Lowenstein Sandler LLP

(57) ABSTRACT

A computing device receives one or more idle state conditions that indicate an idle device state for a class of devices associated with the computing device. The computing device receives an over the air (OTA) update of a firmware of the computing device, where the OTA update is to be applied by the computing device responsive to detecting the idle device state of the computing device. The computing device identifies a device state of the computing device and determines whether the device state satisfies the one or more idle state conditions. Responsive to determining that the first device state of the computing device satisfies the one or more idle state conditions, the computing device applies the OTA update of the firmware to the computing device.

21 Claims, 6 Drawing Sheets

(56) References Cited

U.S. PATENT DOCUMENTS

| | | | |
|---|---|---|---|
| 2015/0324184 A1* | 11/2015 | Foley | G06F 8/65 |
| | | | 717/173 |
| 2017/0374668 A1 | 12/2017 | Tran et al. | |
| 2018/0067738 A1* | 3/2018 | Noto | H04L 41/082 |
| 2018/0176329 A1 | 6/2018 | Chen et al. | |
| 2018/0189048 A1* | 7/2018 | Bala | G06F 8/65 |
| 2018/0270831 A1 | 9/2018 | Meredith et al. | |
| 2019/0259223 A1* | 8/2019 | Sangameswaran | G07C 5/0841 |
| 2020/0174779 A1* | 6/2020 | David | G06F 8/65 |

* cited by examiner

EDGE-BASED INTELLIGENCE FOR OVER THE AIR UPDATE

BACKGROUND

Many modern appliances, consumer devices, and other devices include embedded systems that are configured to perform one or more dedicated functions. Embedded systems of such devices that provide networking capabilities may periodically benefit from updates to the software or firmware that control such capabilities to fix bugs and/or add new functionality.

Updates to computer software and firmware can be delivered to some embedded systems with networking capabilities "over the air" (OTA) from a cloud-based wide area network (WAN) accessible service or other service provider that may deliver a digital image of the software to the embedded system. Typically, when an OTA update is delivered to a device with an embedded system, the update is performed immediately, regardless of whether the device is idle or active. This can be problematic since it can cause the embedded system to reset or restart during periods of device activity, resulting in disruption to device performance and availability.

BRIEF DESCRIPTION OF THE DRAWINGS

Reference will now be made to the accompanying drawings showing example embodiments of the present application.

DETAILED DESCRIPTION OF EMBODIMENTS

Figure 1:
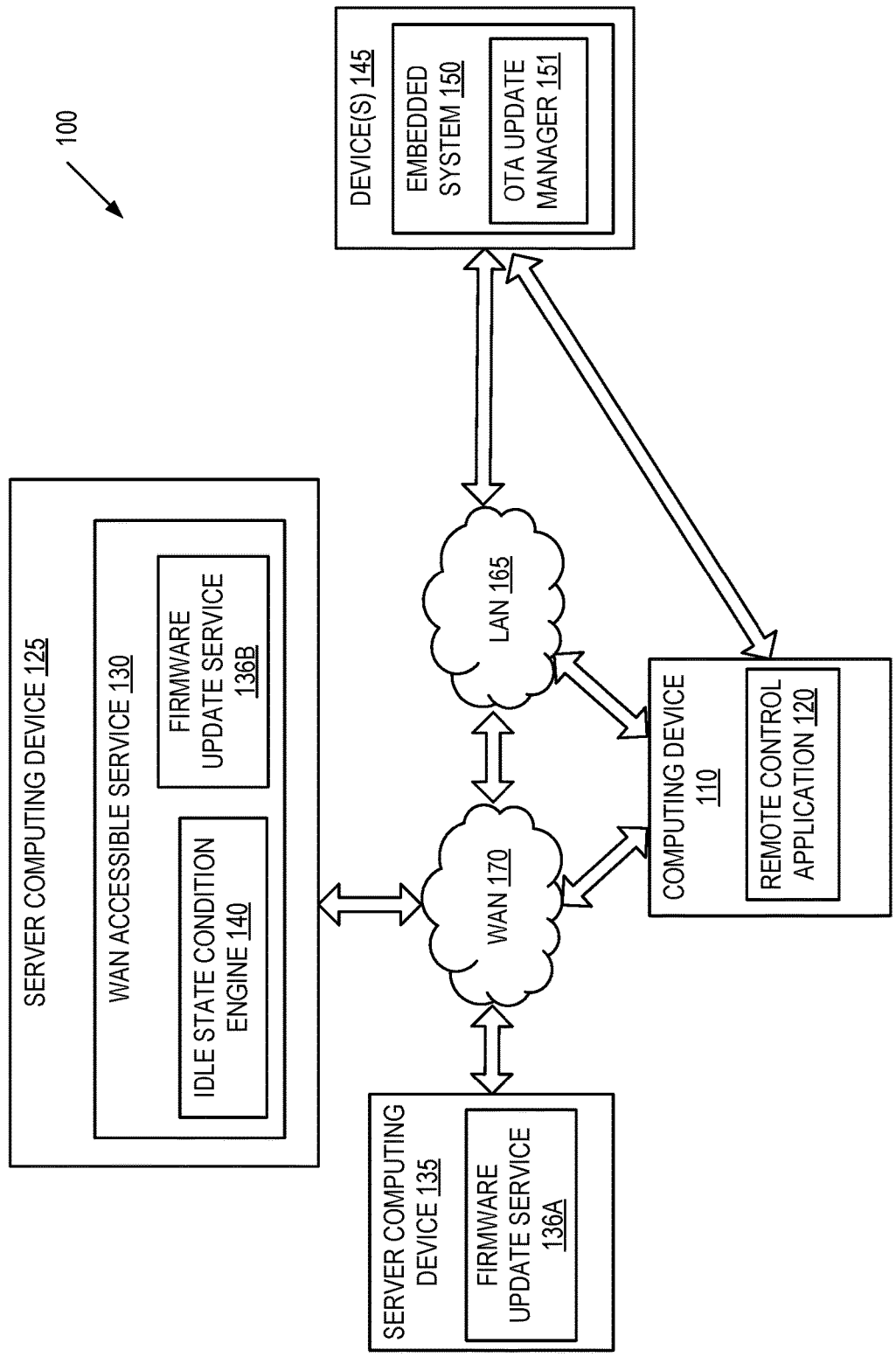
FIG. 1 is a block diagram depicting an example network architecture including remotely accessible embedded systems.

Embodiments described herein are directed to edge-based intelligence for over-the-air (OTA) updates on devices having embedded systems. In embodiments, a device having an embedded system (e.g., an Internet of Things (IoT) enabled device) can monitor its own device state for conditions indicating that the device is idle prior to applying an OTA update of firmware for the embedded system. The embedded system is capable of receiving a set of idle state conditions from a wide area network (WAN) accessible service (e.g., a web service or "cloud" service). The embedded system is further capable of receiving an associated OTA update of the firmware. In embodiments, the idle state conditions may be a set of conditions that indicate when the device with the embedded system is likely to be inactive. The embedded system, upon detecting the idle state conditions, may then apply the OTA update to the embedded system. The WAN accessible service may analyze the device usage information associated with a class of devices and determine the idle state conditions that are most indicative of an idle state for that class of devices. The WAN accessible service may then provide the idle state conditions to a device with an embedded system along with an associated OTA update of firmware for the embedded system.

Conventional systems typically implement OTA updates to devices using brute force methods whereby the device applies the update immediately upon receipt without taking into account whether the device is actually in use. This can cause disruption to the functionality of the device since the update may be applied while the device is being used. In some conventional systems, a basic rule set may be implemented for OTA updates to firmware for all devices regardless of typical device usage patterns. In these cases, the server that hosts the update determines a time to apply the update and sends the update to all devices at that time. Again, this can cause disruption to device functionality if a particular device is in use during the determined update period. Additionally, many conventional systems involve devices sending frequent reports of state information to a connected server so the server can determine when to send an OTA firmware update to the device. This can lead to significant increases in network traffic.

Aspects of the present disclosure remedy the above noted and other deficiencies by implementing an OTA update manager within an embedded system of a device that can intelligently determine when to apply an OTA firmware update and/or when to retrieve an OTA firmware update without disrupting device functionality. The associated WAN accessible service can analyze historical usage patterns for a class of devices to determine the conditions that are indicative of an idle state for the device and provide those conditions to the embedded system. The embedded system may then assume control over when the OTA firmware update may be applied to the embedded system at a time when the device is not in use. Thus, aspects of the present disclosure provide advantages over conventional systems by significantly reducing disruptions caused by firmware updates. Since the embedded system of a device has direct access to the most current information regarding its own usage state than does any connected server, the OTA update manager as described herein can make a more accurate assessment of an idle state based on the most recently observed device activity. Thus, the OTA update manager can apply any OTA update without waiting for the WAN accessible service to determine exactly when to apply the update. Moreover, by transferring management of the OTA update to the embedded system, network traffic can be significantly reduced since the embedded system does not need to report state information to the WAN accessible service repeatedly.

Referring now to the figures, FIG. 1 is a block diagram depicting an example network architecture 100 including remotely accessible embedded systems (e.g., of IoT devices) and computing devices that interact with the embedded systems. The network architecture 100 includes one or more devices 145 and a computing device 110 connected to a local area network (LAN) 165. The devices 145 are devices with embedded systems 150 (e.g., IoT devices), and may include, for example, electrical appliances such as refrigerators, ovens, washers, driers, dishwashers, thermostats, alarms, air conditioners, televisions, radios, receivers, amplifiers, and so forth. The devices 145 may also include consumer devices such as digital watches, music players, game consoles, digital cameras, printers, and so forth. Other examples of devices 145 include stationary devices such as HVAC systems, traffic lights, factory controllers, signs, electronic billboards, sprinkler systems, and irrigation control systems, as well as medical devices. Devices 145 may also be any other type of device that includes an embedded system 150.

An embedded system 150 is a class of computing device that is embedded into another device 145 as one component of the device 145. The device 145 typically also includes other hardware, electrical and/or mechanical components that may interface with the embedded system. Embedded system 150 is typically configured to handle a particular task or set of tasks, for which the embedded system 150 may be optimized. Accordingly, the embedded system 150 may have a minimal cost and size as compared to general computing devices.

The embedded system 150 may include a communication module (not shown) that enables the embedded system 150 (and thus the device 145) to connect to the LAN 165, or alternatively, directly to computing device 110. The communication module may be configured to manage security, manage sessions, manage communications with external devices, and so forth. In one embodiment, the communication module is configured to communicate using Wi-Fi®. Alternatively, the communication module may be configured to communicate using Cellular (3G, 4G, 5G, NB-IoT), LoRAWAN, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

The LAN 165 may include a router, switch, bridge or other network device (not shown) that enables communication between multiple devices (e.g., device 145, computing device 110, etc.) connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi® transceiver.

Some embedded systems 150 may not support any of the communication types supported by the network device. For example, device 145 may support Zigbee, Bluetooth, or the like. To enable such devices to connect to the LAN 165, the LAN 165 may include a gateway device (not shown) connected to the network device via one of the connection types supported by the network device (e.g., via Ethernet or Wi-Fi®). The gateway device may additionally support other communication protocols such as Zigbee, PLC and/or Bluetooth, and may translate between supported communication protocols. Accordingly, some devices 145 may connect to the LAN through the gateway device.

The LAN 165 is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to server computing devices 125-135. The server computing devices 125-135 may include a physical machine and/or a virtual machine hosted by a physical machine. The physical machine may be a rackmount server, a desktop computer, or other computing device. In one embodiment, the server computing devices 125-135 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts a WAN accessible service 130, which may be a web based service and/or a cloud service (e.g., a web based service hosted in a cloud computing platform). The WAN accessible service 130 may maintain a session (e.g., via a continuous or intermittent connection) with the embedded system 150. Alternatively, the WAN accessible service 130 may periodically establish sessions with the embedded system 150. Via a session with an embedded system 150, WAN accessible service 130 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded system 150 may identify values or states of some or all detectable parameters of device 145 that the embedded system 150 is included in. Such values or states may change based direct user interaction with the devices. Such values or states may also change responsive to commands sent to the embedded system 150 by the WAN accessible service 130 and/or by computing device 110. By maintaining or periodically establishing sessions with the embedded systems 150, the WAN accessible service 130 may maintain up-to-date information on the states of the device 145. In some implementations, the status updates received from embedded system 150 can include device related information associated with device 145 such as a unique identifier associated with the device (e.g., a specific device serial number (DSN)), the version number of a firmware component installed on embedded system 150, or the like. WAN accessible service may use the status updates to determine when the firmware installed on embedded system 150 becomes outdated and is in need of update. This may occur when the firmware is updated to provide enhanced capabilities, to correct software errors, to replace expired encryption certificates, or the like.

The WAN accessible service 130 may additionally maintain a session (e.g., via a continuous or intermittent connection) with remote control application 120 of computing device 110. Via a session with remote control application 120, WAN accessible service 130 may receive the device related information described above in instances when embedded system 150 is unable to connect directly to WAN accessible service 130. In instances where the embedded system 150 cannot connect directly to WAN accessible service 130 (e.g., as a result of first time use of device 145, due to a problem with the version of the firmware component installed on embedded system 150, etc.), WAN accessible service may use the session with remote control application 120 as a proxy for communicating with, and delivering firmware updates to, embedded system 150.

WAN accessible service 130 may determine, based on the device related information received from device 145 or the remote control application 120, that the firmware component installed on the embedded system 150 should be updated. WAN accessible service 130 may generate a digital image that contains a firmware update for the embedded system 150. In various embodiments, WAN accessible service 130 may generate an unencrypted digital image for a specific embedded system 150, an unencrypted digital image for multiple embedded systems 150, an encrypted digital image for a specific embedded system 150, an encrypted digital image for multiple embedded systems 150, or the like. In some implementations, WAN accessible service can generate a digital image for the embedded system 150 having the specific DSN for device 145, where the digital image is usable only for device 145 having that specific DSN. In one embodiment, WAN accessible service 130 may compare the specific DSN of device 145 to a list of DSNs for which an encrypted digital image is available. In another embodiment, WAN accessible service may compare the version of the firmware component installed on embedded system 150 to a list of known outdated firmware versions for which a digital image for an OTA update is available and/or can be generated.

In some implementations, WAN accessible service 130 may create the digital image responsive to receiving the device related information from the device 145 or remote control application 120. Alternatively, WAN accessible service 130 may create the digital image prior to receiving the device related information. In some implementations, WAN accessible service 130 may generate separate digital images for each specific DSN that may benefit from a firmware update. For example, WAN accessible service may receive a list of DSNs associated with devices having an old firmware version and generate a unique digital image for each of the DSNs such that each digital image can only be installed (and decrypted if the digital image was encrypted) by the device associated with the DSN for which it was generated (and encrypted). Alternatively WAN accessible service 130 may create and/or encrypt a single digital image that may be used for multiple DSNs (for multiple devices).

In some implementations, WAN accessible service 130 may include an idle state condition engine 140. Idle state condition engine 140 can determine conditions that indicate whether or not a particular device 145 (or class of devices 145) has entered an idle state (e.g., a state where the device is idle). A device's idle state can represent an optimal period during which the update to the firmware component may be implemented without causing unnecessary disruption to the device. Idle state condition engine 140 may first identity a target set of candidate devices to receive the update to the firmware component as an over-the-air (OTA) update. Idle state condition engine 140 may identify the set of target devices based on one or more device attributes associated with the device. A device attribute may be a property of the device (e.g., a device serial number, model number, etc.), a client identifier (e.g., information associated with the device owner or client), a device location, a device sensor value or state, a device usage value (e.g., the number of times a device has been used over a particular period of time), the current firmware version installed on the device, or other similar types of information.

Idle state condition engine 140 may then determine one or more idle state conditions that indicate an idle device state for the class of devices associated with the identified target set of candidate devices. The idle state conditions may include a set of rules that can be used by a device 145 to determine when to apply a firmware update. For example, the idle state conditions may include a particular time period (e.g., a window of time indicative of low activity), a particular level of observed communication activity (e.g., if network activity meets a threshold value), a particular level of observed device activity (e.g., if the main functionality of the device is not currently active), or the like. Should the device 145 observe the conditions specified by the rules, the device 145 may determine that a firmware update may be installed. In some implementations, the idle state conditions may include a simplified machine learning classifier component that is executed by the device 145. In such cases, the simplified classifier component can monitor the device state and detect the presence of the idle state conditions.

In some embodiments, idle state condition engine 140 further gathers information from devices about network activity, and the idle state condition rules may include rules to determine whether a device is under low network usage conditions, medium network usage conditions, high network usage conditions or degraded network conditions. Such rules may be used to by an OTA update manager 151 to determine when to download a firmware update (e.g., to download a firmware update when network usage is low or when network conditions are not degraded).

In some implementations, idle state condition engine 140 may utilize a machine learning neural network to analyze any collected device related information and/or network usage information for the devices in the set of candidate devices to determine the set of idle conditions. For example, idle state condition engine 140 may analyze collected usage statistics of the devices in the target set to identify periods where the class of devices are most likely to be inactive (e.g., in an idle state). Alternatively, idle state condition engine 140 may receive the set of idle state conditions from a user interface of a management console.

Idle state condition engine 140 may then select a device 145 from the set of candidate devices to receive the firmware update. In some implementations, idle state condition engine 140 may process the set of candidate devices as a list of candidate devices and select the device to receive the update by selecting one of the devices from the list. In some implementations, idle state condition engine 140 may select and process the devices from the list one at a time. Alternatively, idle state condition engine 140 may select a subset of the candidate devices to receive the update as a group based on a selection criteria (e.g., location, client, etc.). The device may also be selected from a list of devices presented by the user interface of the management console.

Once the candidate device 145 (or devices 145) has been selected to receive the firmware update, idle state condition engine 140 may provide the idle state conditions to the selected device 145. Alternatively, idle state conditions may be determined and sent to a device before a firmware update is generated. A WAN accessible service 130 (e.g., firmware update service 136B) may then notify the embedded system 150 of device 145 that a firmware update is available and/or may send the firmware update to the embedded system of device 145.

The device 145 may subsequently monitor its device state for the idle state conditions to determine when to download a firmware update and/or when to apply the firmware update. In some implementations, idle state condition engine 140 may send the idle state conditions to the selected device 145, causing the device 145 to monitor for those conditions. Alternatively, idle state condition engine 140 may send a notification to the device 145 to cause the device 145 to retrieve the idle state conditions from WAN accessible service 130. In some embodiments, idle state condition engine 140 may provide the idle state conditions to the device 145 with the applicable OTA firmware update. In other implementations, idle state condition engine 140 may provide the idle state conditions to the device 145 at one time and make the OTA firmware update available to the device at a later time.

WAN accessible service 130 may include firmware update service 136B to provide a digital image for the OTA firmware update (e.g., which may be an encrypted digital image) to OTA update manager 151 of device 145. Firmware update service 136B may provide the digital image by sending a location (e.g., a uniform resource locator (URL)) of the digital image to OTA update manager 151 so that OTA update manager 151 may download the digital image from the location in some implementations. In some implementations, the location of the digital image may instruct OTA update manager 151 to connect with a sub-component of WAN accessible service 130. Alternatively, the location may instruct OTA update manager 151 to connect a component outside of WAN accessible service 130, such as firmware update service 136A.

In one embodiment, the server computing device 135 hosts firmware update service 136A, which may be a web based service and/or a cloud service (e.g., a web based service hosted in a cloud computing platform). Firmware update service 136A may provide the ability to host digital images for download separately from firmware update service 136B of WAN accessible service 130. One example of such a service is Amazon's® Simple Storage Service (S3®). In some implementations, firmware update service 136A may execute on a separate server computing device from WAN accessible service 130. Alternatively, firmware update service 136A and WAN accessible service 130 may execute on the same server computing device.

In some implementations, embedded system 150 of device 145 may include an OTA update manager 151. OTA update manager 151 may be responsible for receiving the idle state conditions from WAN accessible service 130, retrieving the OTA firmware update, and monitoring the device state of device 145 for the presence of the idle state conditions. Once the idle state conditions are detected, OTA update manager 151 may then apply the OTA firmware update to the embedded system 150.

OTA update manager 151 may receive the idle state conditions from WAN accessible service 130 as described above. As noted above, the idle state conditions may be a set of rules that OTA update manager 151 can use when monitoring the device state of device 145. Alternatively, the idle state conditions may be incorporated into a simplified machine learning classifier (e.g., a machine learning model trained to identify idle states) that is used by OTA update manager 151 to detect the presence of an idle state. In such instances, OTA update manager 151 can capture the observed device state conditions and input those observed conditions into the classifier. The classifier can then indicate to OTA update manager 151 whether the device 145 is idle or not.

Subsequently, OTA update manager 151 may receive the OTA update of the firmware for the embedded system 150. Again, as described above, the OTA update of the firmware may be received together with the idle state conditions, or may be received/retrieved separately. OTA update manager 151 may receive and/or retrieve a digital image containing the OTA update of the firmware from firmware update service 136B. As noted above, the digital image may an encrypted digital image, which may be encrypted specifically for device 145 having the unique identifier included in the device related information sent to WAN accessible service 130, and in such implementations is unusable on other devices that are the same model as device 145. In some implementations, OTA update manager 151 may first receive location information from firmware update service 136B that indicates where the digital image is stored. This location may be a storage location on the same server computing device as firmware update service 136B. Alternatively, the location may be a storage location on another server computing device, such as that accessible to firmware update service 136A of server computing device 135. OTA update manager 151 may then retrieve the digital image from the received location and store it in a storage area of the device 145. The storage area may be persistent storage, flash storage, device memory, or the like.

In some implementations, OTA update manager 151 may begin monitoring the state of device 145 for the idle state conditions when both the conditions and the OTA firmware update are received and stored on device 145. Alternatively, OTA update manager 151 may begin monitoring for the idle state conditions prior to receiving the OTA firmware update. For example, OTA update manager 151 may begin monitoring for the idle state conditions and retrieve the applicable OTA firmware update at a later time (e.g., during a period of low network usage). Alternatively, OTA update manager 151 may begin monitoring for the idle state conditions and retrieve the OTA firmware update when the idle state conditions have been satisfied (e.g., when the device is idle).

Responsive to determining that the device state of device 145 satisfies the idle state conditions, OTA update manager 151 may then apply the OTA update of the firmware to the embedded system 150 of device 145. In some implementations, OTA update manager 151 may save the current device state prior to applying the update, and then apply the update. Should the update complete successfully, OTA update manager 151 may delete the saved state and send a notification to WAN accessible service 130 to indicate that the update was completed successfully. Should the update fail to complete successfully, OTA update manager 151 may then restore the saved device state and send a notification to WAN accessible service 130 to indicate that the update was not completed successfully.

One example of a WAN accessible service is described in further detail below with respect to FIG. 2. One example of an embedded system is described in further detail below with respect to FIG. 3.

Computing device 110 may include portable devices such as electronic book readers, portable digital assistants, mobile phones, laptop computers, portable media players, tablet computers, cameras, video cameras, netbooks, notebooks, and the like. Computing device 110 may also include traditionally stationary devices such as desktop computers, gaming consoles, digital video disc (DVD) players, media centers, and the like. Computing device 110 may connect to the WAN 170 and/or to the LAN 165. Computing device 110 may connect to the LAN 165 when it enters a proximity to the LAN 165 sufficient to exchange data with a network device associated with the LAN 165. This may include coming within a particular proximity to a wireless antenna associated with the LAN 165 and/or physically connecting to the LAN 165 via, for example, an Ethernet cable.

Computing device 110 can include a remote control application 120. The remote control application 120 may be configured to interface with and/or control one or more of the devices 145 via the devices' embedded systems 150. In one embodiment, the computing device 110 may include separate remote control applications for each of the embedded systems of any devices in the network. Alternatively, the computing device 110 may include a single remote control application that is capable of communicating with and controlling embedded system for multiple different devices. Remote control application 120 may communicate with embedded system 150 using an encrypted connection to LAN 165, directly using an unencrypted connection with embedded system 150 operating in AP mode, or indirectly using an encrypted connection with WAN accessible service 130.

While computing device 110 is connected to WAN 170, remote control application 120 may establish a session with the WAN accessible service 130. The WAN accessible service 130 may provide an interface for indirectly controlling and monitoring the device 145. If a user desires to change a state of a device, the user may issue a command via the remote control application 120, and that command may be sent to the WAN accessible service 130. The WAN accessible service 130 may then forward the command on to the appropriate embedded system. Additionally, when the WAN accessible service 130 receives updated state information for a device from an embedded system, the WAN accessible service 130 may forward the state information on to the remote control application. This may enable users to connect to and control the device 145 from anywhere they have access to the Internet.

When a computing device 110 connects to the LAN 165, the remote control application 120 may automatically establish a direct connection to embedded system 150 if embedded system 150 is also connected to the LAN 165. While the computing device 110 is connected to the LAN 165, it may maintain a session with, and control, embedded system 150 even in the absence of a connection to WAN 170 (e.g., if LAN 165 loses a broadband Internet connection).

In an illustrative example, if the computing device is a mobile phone, then the computing device may connect to the LAN 165 using a Wi-Fi® radio. The computing device may connect to WAN 170 and WAN accessible service 130 through a connection with a wireless carrier system (e.g., though a global system for mobile communications (GSM), code division multiple access (CDMA), wideband code division multiple access (WCDMA), time division multiple access (TDMA), universal mobile telecommunications system (UMTS), long term evolution (LTE), worldwide interoperability for microwave access (WiMAX) or other wireless communication protocol connection).

Remote control application 120 may additionally be used as a proxy to provide firmware updates and/or idle state conditions to embedded system 150 when WAN accessible service 130 cannot communicate with embedded system 150. Firmware updates and/or idle state conditions may be provided to embedded system 150 during first time setup device 145, or if a firmware update is beneficial sometime after device 145 is set up to correct a problem that may prevent embedded system 150 from communicating with WAN accessible service 130.

Figure 2:
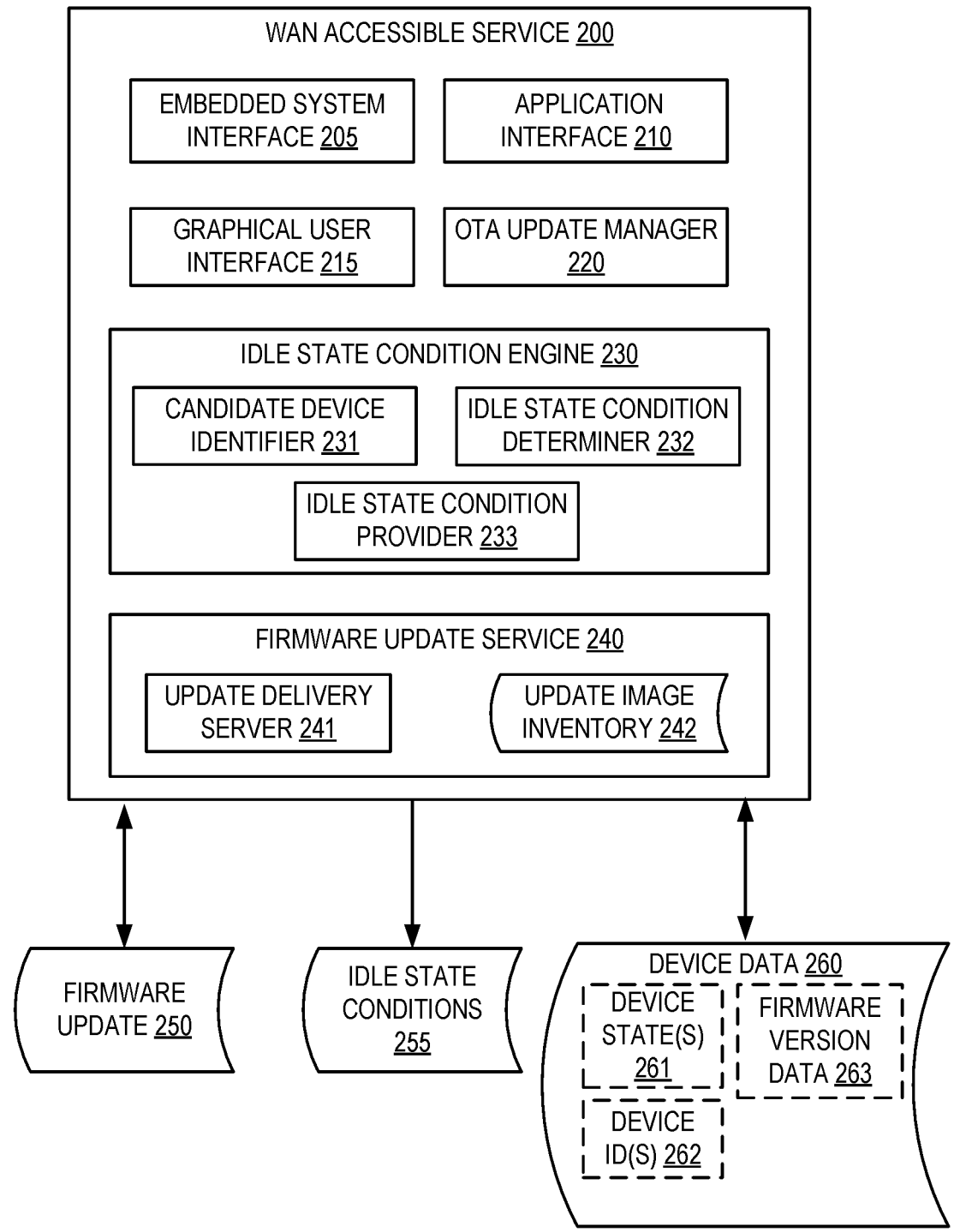
FIG. 2 is a block diagram of an example embodiment of a wide area network (WAN) accessible service.

FIG. 2 is a block diagram of an example embodiment of a WAN accessible service 200, which in one embodiment corresponds to WAN accessible service 130 of FIG. 1. WAN accessible service 200 may include an embedded system interface 205, an application interface 210, a graphical user interface 215, an OTA update manager 220, an idle state condition engine 230, and a firmware update service 240. Alternatively, the functionality of one or more of the embedded system interface 205, an application interface 210, a graphical user interface 215, an OTA update manager 220, an idle state condition engine 230, and a firmware update service 240 may be combined into a single module or divided into multiple sub-modules. While FIG. 2 depicts firmware update service 240 as a component of WAN accessible service 200, in some implementations firmware update service 240 may be separate from WAN accessible service 200. Firmware update service 240 may be included on the same sever computing device as WAN accessible service 200, or may be included on a separate server computing device.

Embedded system interface 205 is responsible for connecting to embedded systems. WAN accessible service 200 may establish secure sessions with and/or maintain secure sessions with one or many embedded systems. Via the active sessions, embedded system interface 205 may send notifications, property updates and/or control messages to the embedded systems and receive acknowledgments, status updates (e.g., device state 261), and other information (e.g., device ID 262) from the embedded systems.

Application interface 210 is responsible for connecting to remote control applications. Application interface 210 may enable users to log in to user accounts on WAN accessible service 200 by providing the proper credentials. A secure session may be established with the remote control applications as a part of the log in process. Once a secure session is established (e.g., via SSL) and a remote control application is logged into a particular user account, application interface 210 may provide the remote control application with updated status information for embedded systems to which the remote control application is registered. Additionally, application interface 210 may receive commands from the remote control application for modifying a state of (or otherwise controlling) one or more embedded systems with which the remote control application is registered. Application interface 210 may receive device related information associated with an embedded system, such as a unique identifier associated with the device (e.g., a specific device serial number (DSN)), the version number of a firmware component installed on an embedded system, or the like. Application interface 210 may store the device related information in device data 260 so that it may be used by OTA update manager 220 (or other components of WAN accessible service 200) to determine if a firmware update is available for installation on an embedded system.

Graphical user interface 215 may be a web interface that is accessible from computing devices using a web browser. Accordingly, computing devices that do not include a remote control application may still log into a user account for monitoring and/or controlling embedded systems via the graphical user interface 215. In some implementations, graphical user interface 215 may be used to identify a subset of candidate devices from a group of devices eligible for a firmware update. Similarly, graphical user interface 215 may be used by a user to directly input idle state conditions to be sent to a device for use with applying the firmware update.

OTA update manager 220 may determine whether a digital image for a firmware update (e.g., firmware update 250) is available for the embedded system of a particular device or group of devices. As noted above, the firmware update may be provided to a group of IoT devices (e.g., devices that include an embedded system) using an OTA update. In some implementations, OTA update manager 220 may use the device related information received by application interface 210 to make this determination. In one embodiment, OTA update manager 220 may compare the specific DSN of the device received in the device related information to a list of DSNs for which a firmware update (e.g., an encrypted digital image) is available. In another embodiment, OTA update manager 220 may compare the version of the firmware component installed on the embedded system of the device to a list of known outdated firmware versions for which an encrypted digital image is available. In another embodiment, OTA update manager 220 may receive a preselected device or list of devices for which a firmware update is available from graphical user interface 215. In some implementations, OTA update manager may receive a digital image for a firmware update from another device or service. Alternatively, OTA update manager 220 may be responsible for generating the digital image for the firmware update.

Idle state condition engine 230 may be responsible for identifying one or more candidate devices to receive the firmware update, determining the idle state conditions for the candidate devices, and providing the determined idle state conditions to the candidate device(s). In some implementations, idle state condition engine 230 may include candidate device identifier 231, idle state condition determiner 232, and idle state condition provider 233.

Candidate device identifier 231 may be responsible for identifying a set of candidate devices from the group of devices that are to receive the OTA firmware update. Candidate device identifier 231 may identify the set of candidate devices using a selection criteria that includes one or more device attributes. In some implementations, the device attributes may include a device property (e.g., a serial number, a device type, device class, etc.), a client identifier (e.g., a unique identifier associated with the device owner or client), a device location (e.g., IP address, GPS location, mailing address of the device owner, etc.), a device usage value (e.g., the number of times a device has been used over a particular period of time), the current firmware version installed on the device, or other similar types of classification information associated with a device.

For example, candidate device identifier 231 may examine the group of devices for which a firmware update is available, and select only those devices that have a particular firmware version already installed. Similarly, candidate device identifier 231 may select only those devices that are deployed in a particular geographical location. In some implementations, candidate device identifier 231 may use a combination of selection criteria (e.g., all devices of a particular device type that are deployed in San Francisco and that have a particular firmware version already installed). Once the set of candidate devices has been determined, the identifying information for the identified candidate devices may be stored for later use with firmware and idle state condition deployment.

Idle state condition determiner 232 may be invoked to determine one or more idle state conditions that indicate an idle device state for the class of devices associated with the set of candidate devices selected by candidate device identifier 231. As noted above, the idle state conditions may include a set of rules and/or a trained machine learning model that can be used by a device with an embedded system to determine when to apply a firmware update. For example, the idle state conditions may include a particular time period (e.g., a window of time indicative of low activity), a particular level of observed communication activity (e.g., if network activity meets a threshold value), a particular level of observed device activity (e.g., if the main functionality of the device is not currently active), or the like. In some implementations, the idle state conditions may be in the form of a rule set that is provided to the embedded system of a candidate device. Alternatively, the idle state conditions may be in the form of a simplified machine learning classifier component that is executed by the embedded system of the candidate device. In such cases, inputs may be provided to the simplified classifier component to enable the simplified classifier component to detect the presence of the idle state conditions. The inputs may be a set of device states, parameters, network activity and/or other device information. The inputs may be input into the simplified classifier on a periodic basis (e.g., every second, every few seconds, every minute, etc.) in some embodiments. In some embodiments, the simplified classifier is a trained recurrent neural network (RNN) that uses current inputs as well as stored information on past inputs to determine whether an idle state condition is satisfied.

In some implementations, idle state condition determiner 232 may receive the set of idle state conditions from a user interface of a management console (e.g., via graphical user interface 215). Alternatively, idle state condition determiner 232 may utilize a machine learning model (e.g., a neural network, deep network, RNN, etc.) to analyze any collected device related information for the set of candidate devices to determine the set of idle conditions. In an illustrative example, idle state condition determiner 232 may perform clustering on historical data of device state activity associated with the set of candidate devices to divide the historical data into a first subset indicative of an idle state and a second subset indicative of an active state. Idle state condition determiner 232 may then determine one or more idle state conditions for the first subset (the idle state subset) and one or more active state conditions for the second subset (the active state). Idle state condition determiner 232 may then generate a machine learning model trained to classify between the idle state and the active state of a device. The machine learning model may be provided to the embedded system of the device such that it can input observed device conditions into the model and the model can indicate to the embedded system whether or not the device is in an idle state.

In some implementations, candidate device identifier 231 may again be invoked to select one or more of the candidate devices from the identified set of candidate devices to receive the firmware update and the associated idle state conditions. In one embodiment, candidate device identifier 231 may select all of the identified candidate devices to receive the firmware update and associated idle state conditions. Alternatively, candidate device identifier 231 may select a subset of the identified candidate devices. In some implementations, candidate device identifier 231 may be invoked by graphical user interface 215 in response to a user selection of one or more candidate devices from the group.

Idle state condition provider 233 may then be invoked to provide the idle state conditions (e.g., idle state conditions 255) to the selected candidate devices. In one embodiment, idle state condition provider 233 can send the idle state conditions 255 to the candidate device(s) to cause the candidate device(s) to monitor for those conditions before applying any associated firmware update. In another embodiment idle state condition provider 233 may send a notification to the candidate device to cause the device to retrieve the idle state conditions 255 from WAN accessible service 200.

In some implementations, idle state condition provider 233 may send the idle state conditions 255 to the candidate device together with the associated firmware update (e.g., sent in a single transmission or as separate transmissions that occur at approximately the same time). Similarly, in some embodiments, any notification sent to the device to cause the device to retrieve the idle state conditions 255 may also cause the device to retrieve the OTA firmware update at approximately the same time. In other implementations, idle state condition provider 233 may provide the idle state conditions 255 to the candidate device at one time and make the OTA firmware update available to the device at a later time. For example, idle state condition provider 233 may provide the idle state conditions 255 to the candidate device and the candidate device may begin monitoring for the conditions prior to receiving the OTA firmware update. Subsequently, the OTA firmware update may be provided to the candidate device when the appropriate encrypted digital image for the applicable device has been generated.

Firmware update service 240 may provide a digital image for an OTA firmware update 250 to an embedded system of the candidate device by maintaining a server process to which the embedded system may connect to retrieve the OTA firmware update 250. Firmware update service 240 may include update delivery server 241 and update image inventory 242. In one embodiment, update delivery server 241 may be a hypertext transfer protocol (HTTP) process. In one embodiment, update delivery server 241 may be a file transfer protocol (FTP) process. Update delivery server 241 can accept an incoming session request from the embedded system to retrieve the firmware update 250. Update image inventory 242 may contain the location information for each encrypted digital image available for download. For example, update image inventory 242 may contain the URLs associated with each available encrypted digital image for OTA firmware update 250 that may be sent to an embedded system of a candidate device so that the embedded system may initiate the download of OTA firmware update 250.

Figure 3:
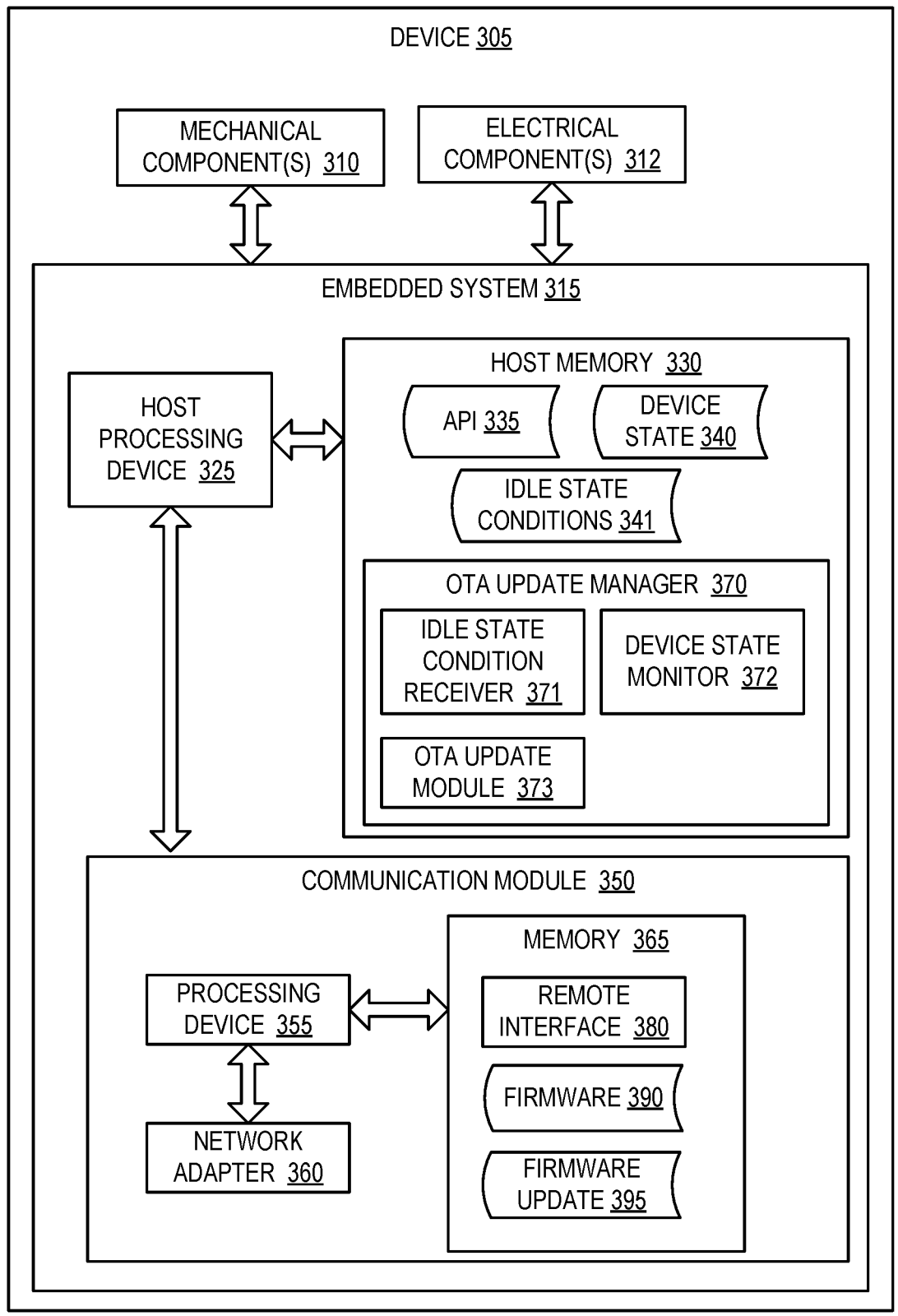
FIG. 3 is a block diagram of an example device having a remotely accessible embedded system.

FIG. 3 is a block diagram of an example device 305 having a remotely accessible embedded system 315. The device 305 may include any of the aforementioned types of devices having an embedded system, and in one embodiment corresponds to a device 145 of FIG. 1. In one embodiment, the device 305 includes mechanical components 310, electrical components 312 and an embedded system 315. The electrical components 312 and/or mechanical components 310 may include sensors, programmable logic controllers (PLCs), switches, motors, valves, actuators, and so forth.

The embedded system 315 may include a host processing device 325, a host memory 330 and/or a communication module 350 coupled to the host processing device 325. The embedded system 315 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 325 may be a microcontroller or a digital signal processor (DSP) in one embodiment. Host processing device 325 may alternatively or additionally include a programmable logic controller (PLC), a field programmable gate array (FPGA) or a complex programmable logic device (CPLD). The host processing device 325 may be configured to perform specific functions related to the operation and control of the device 305.

Host memory 330 may include random access memory (RAM), read only memory (ROM), one time programmable (OTP) ROM, Flash (e.g., NOR Flash), or other types of memory. Host memory 330 may store an application programming interface (API) 335 for the communication module 350. The API 335 may enable the host processing device 325 to send commands and/or data to and receive commands and/or data from communication module 350.

Host memory 330 may additionally include a device state 340 for the device 305. The device state 340 may include a present device state, historical device state, and/or changes made to the device state over a particular period. For example, device state 340 in one embodiment includes changes made to the device's state since a connection to a WAN accessible service was lost. Device state 340 may store the current connectivity state of device 305 with the WAN accessible service (active, inactive, etc.) as well as the version number information of any firmware 390 installed on communication module 350 of device 305. Host memory 330 may also include firmware for the host processing device 325 that configures the host processing device to perform one or more operations that are specific to device 305.

In some embodiments, the host memory 330 may be integrated into the host processing device 325. For example, microcontrollers typically include a processor core, memory and programmable input/output peripherals. Accordingly, if the host processing device 325 is a microcontroller, then host memory 330 may be a memory of host processing device 325.

Host memory 330 may include an OTA update manager 370. OTA update manager 370 may be responsible for receiving the idle state conditions from a WAN accessible service, retrieving an OTA firmware update 395, and monitoring the device state 340 of device 305 for the presence of the idle state conditions. Once the idle state conditions are detected, OTA update manager 370 may then apply the OTA firmware update 395 to the embedded system 315. In some implementations, OTA update manager 370 may correspond to the OTA update manager 151 of FIG. 1. OTA update manager 370 may include an idle state condition receiver 371, a device state monitor 372, and an OTA update module 373. Alternatively, the functionality of one or more of the idle state condition receiver 371, a device state monitor 372, and an OTA update module 373 may be combined into a single module or divided into multiple sub-modules. While FIG. 3 depicts OTA update manager 370 as a component of host memory 330, in some implementations OTA update manager 330 (or its sub components) may be a component of memory 365 of communication module 350.

Idle state condition receiver 371 is responsible for receiving one or more idle state conditions that indicate an idle device state for the class of devices associated with device 305. For example, if device 305 is a IoT enabled thermostat, the idle state conditions received may correspond to those conditions that indicate a device idle state for thermostats (e.g., a time period, a network communication level, an observed processing level associated with host processing device 325 or processing device 355, etc., that indicate when the thermostat is not being used).

Idle state condition receiver 371 may receive the idle state conditions from a WAN accessible service. Alternatively, Idle state condition receiver 371 may receive the idle state conditions from a remote control application executing on another device as a proxy for a WAN accessible service. Idle state condition receiver 371 may be invoked by OTA update manager 370 after receiving a notification from a WAN accessible service that a firmware update is available for device 305. Alternatively, idle state condition receiver 371 may be invoked by a notification that idle state conditions are available for device 305 regardless of whether or not there is an available firmware update. In the latter case, OTA update manger 370 may retrieve the firmware update at a later time. Idle state condition receiver 371 may then store the idle state conditions in idle state conditions 341.

As noted above with respect to FIG. 1 and FIG. 2, the idle state conditions may be a set of rules that OTA update manager 370 can use when monitoring device state 340. Alternatively, the idle state conditions may be incorporated into a trained machine learning model such as a simplified machine learning classifier that is used by OTA update manager 370 to detect the presence of an idle state. In such instances, OTA update manager 370 can input the observed device state conditions 340 into the classifier. The classifier can then indicate to OTA update manager 370 whether the device 305 is idle or not.

Subsequently, OTA update module 373 may be invoked to receive the OTA firmware update 395. In some implementations, a notification is received from a WAN accessible service that indicates that the OTA firmware update 395 is available for retrieval, causing OTA update module 373 to initiate the download. In one embodiment the notification is received and processed by remote interface 380 of communication module 350 as described in further detail below.

In some implementations, the idle state conditions 341 may be received from the WAN accessible service together with the associated firmware update 395 (e.g., sent in a single transmission or as separate transmissions that occur at approximately the same time). In one embodiment, the received notification that indicates that OTA firmware update 395 is available may additionally invoke idle state condition receiver 371 to retrieve the idle state conditions 341 at approximately the same time. In another embodiment, a received notification that indicates that idle state conditions 341 are available may additionally invoke OTA update module 373 to retrieve the associated OTA firmware update 935 at approximately the same time.

In other implementations, the WAN accessible service may provide the idle state conditions 341 to OTA update manager 370 at one time and make the OTA firmware update 395 available at a later time. For example, idle state condition receiver 371 may initially retrieve the idle state condition 341 from the WAN accessible service (e.g., in response to a received notification from the WAN accessible service). Device state monitor 372 may then be invoked to monitor device state 342 the conditions included in idle state conditions 341 prior to receiving the OTA firmware update 395. Subsequently, OTA update module 373 may be invoked to retrieve OTA firmware update 395 when the appropriate digital image for the applicable device has been generated and made available for download. Alternatively, OTA update module 373 may be invoked to retrieve the OTA firmware update 395 if and when the conditions included in idle state conditions 341 are satisfied. In this latter instance, when the conditions are detected, OTA update module 373 may be invoked to retrieve the firmware update 395 and apply it to memory 365 when the retrieval has been successfully completed.

Device state monitor 372 is responsible for monitoring device state 340 to determine whether the current device state of device 305 satisfies the conditions included in idle state conditions 341. As noted above, idle state conditions 341 may be a set of rules that describe conditions indicating the presence of an idle state for device 305. In such instances, device state monitor 372 may examine the information in device state 340 using the set of rules in idle state conditions 341 to determine whether or not device 305 is idle. For example, idle state conditions 341 may include a rule that specifies a specific time (or time period). Alternatively, the idle state conditions 341 may specify a particular usage level (e.g., a usage level that indicates that the device is currently inactive). Device state monitor 372 can compare the information present in device state 340 to the rule set included in idle state conditions 341 to make its determination.

In other implementations, idle state conditions 341 may include a simplified machine learning classifier model that is used by device state monitor 372 to detect the presence of an idle state for device 305. In such instances, device state monitor 372 can retrieve information from device state 370 and input that information into the simplified machine learning classifier model. The model can then indicate to device state monitor 372 whether or not device 305 is idle. In various embodiments the machine learning classifier model is "simplified" in that it is a streamlined version of a model that does not continuously learn from additional input. As such, it may sufficient to detect the presence of idle state conditions without continuously analyzing previous activity of the device to refine what the idle state conditions may include.

Responsive to determining that the observed device state 340 satisfies the conditions in idle state conditions 341, device state monitor 372 may invoke OTA update module 373 to apply OTA firmware update 395 to embedded system 315 of device 305. In some implementations, OTA update module 373 can save device state 340 in another location in memory to a saved state prior to applying the update. After saving the device state and applying the update, OTA update module 373 can determine a completion status of the OTA firmware update (e.g., whether or not the update has completed successfully). Subsequently, OTA update module 373 may send a notification to the WAN accessible service that indicates the completion status (e.g., success or failure). In some implementations, WAN accessible service may take additional action based on the completing status. For example, if the update was completed successfully, the WAN accessible service can update device related information to account for the updated firmware. Alternatively, if the update failed, WAN accessible service may provide additional instructions to OTA update manager 370 with respect to the firmware update (e.g., whether or not to retry the update).

Responsive to detecting a failure to apply the OTA firmware update 395, OTA update module 373 can restore the saved device state to device state 340. Subsequently, OTA update module 373 may identify a device state condition that cause the failure to apply the OTA firmware 395 and take additional action based on the identified condition. In some implementations, OTA update module 373 may reapply the OTA firmware update 395 responsive to determining that the identified device state condition that caused the failure has ceased. For example, if OTA update module 373 determines that the failure to apply the update was caused by a lack of available memory resources (e.g., not enough memory to complete the firmware update), OTA update module 373 may attempt to retry applying the update when additional memory resources become available.

In some implementations, OTA update module 373 may abort reapplying the OTA firmware update 395 based on the identified device state condition that caused the failure. For example, if OTA update module 373 determines that the failure was caused by the absence of a critical hardware component associated with the update, then OTA update module 373 may abort reapplying the update and notify the WAN accessible service accordingly. Similarly, if OTA update module 373 determines that the OTA firmware update 395 does not satisfy an authentication process, OTA update module 373 may also abort reapplying the update and attempt to re-download the update from the WAN accessible service.

In some implementations, device state monitor 372 may examine device state 340 based on a predetermined time interval. For example, device state monitor 372 may examine device state 340 and determine that the observed device state does not satisfy the conditions in idle state conditions 341 (e.g., device 305 is not in an idle state). In such instances, device state monitor 372 may wait for the expiration of a time interval prior to examining the device state 340 again. In such cases, device state monitor 372 may start a timer that expires at the expiration of the time interval. When the timer expires, device state monitor 372 may examine the device state 340 again to determine whether device 305 is in an idle state.

In some implementations, the time interval is received from the WAN accessible service with the idle state conditions 341. Alternatively, device state monitor 372 may determine a time interval using historical activity stored in device state 340. In such instances, device state monitor 372 can analyze historical activity information stored in device state 340 to identify time periods of inactivity for device 305. Device state monitor 372 may then determine the time interval in view of the identified periods of inactivity. Thus, device state monitor 372 may intelligently determine how often to monitor device state 340 based on its own knowledge of device 305 without accessing information from a WAN accessible service or other outside device.

In some implementations, idle state conditions 341 may be received from the WAN accessible service with an associated expiration time period. In such instances, device state monitor 372 may continue to examine the device state 340 for the conditions included in idle state conditions 341 until the expiration time period is met. If the conditions included in idle state conditions 341 are not satisfied when the expiration period is met, OTA update manager 370 may cease monitoring the device state and take an alternative action with respect to the associated OTA firmware update 395.

In one embodiment, OTA update manager 370 may "force apply" OTA firmware update 395 when the expiration time period is met. In other words, OTA update manager 370 may apply the pending OTA firmware update 395 without waiting any longer for the device 305 to enter an idle state. In an illustrative example, device state monitor 372 may be invoked to begin monitoring the device state 340. Device state monitor 372 may conduct an initial check of the device state 340 for the idle state conditions. Responsive to determining that the device state 340 does not satisfy the conditions included in idle state conditions 341 during this initial check, device state monitor 372 may start a timer that expires at the end of the expiration time period. Once device state monitor 372 determines that this timer has expired without the idle state conditions being met, device state monitor 372 can cease monitoring the device state 340 and invoke OTA update module 373 to apply the OTA firmware update 395 to embedded system 315.

In another embodiment, OTA update manager 370 may abandon the OTA firmware update 395 when the expiration time period is met. In other words, OTA update manager 370 may stop not apply the pending OTA firmware update 395 at all. In an illustrative example, device state monitor 372 may be invoked to begin monitoring the device state 340. Device state monitor 372 may conduct an initial check of the device state 340 for the idle state conditions. Responsive to determining that the device state 340 does not satisfy the conditions included in idle state conditions 341 during this initial check, device state monitor 372 may start the timer that expires at the end of the expiration time period. Once device state monitor 372 determines that this timer has expired without the idle state conditions being met, device state monitor 372 can cease monitoring the device state 340 and delete the OTA firmware update 395 from memory 365.

Device state monitor 372 may then send a notification to the WAN accessible service to indicate that the update of the firmware has failed. In some implementations, the WAN accessible service may subsequently resend the update to embedded system 315 at a later time. Alternatively, Device state monitor 372 may send the notification indicating the update failure without first deleting the OTA firmware update 395 from memory 365. In such cases, the WAN accessible service may send a notification to OTA update manager 370 with further instructions. For example, the notification may instruct OTA update manager 370 to delete the OTA firmware update 395 from memory 365. Alternatively, the notification may instruct OTA update manager 370 to restart the monitor process to reattempt installation of the OTA firmware update 395.

Communication module 350 may be an integrated circuit (IC) that is configured to be coupled to host processing device 325 of embedded system 315. Communication module 350 may be provided by a third party to a manufacturer of the device along with the API 335, and may enable network capability and remote control capability to be easily added to the device 305. The communication module 350 may include its own processing device 355, a memory 365 and/or a network adapter 360. The processing device 355 may be a microcontroller, a system on a chip (SoC), a digital signal processor (DSP), a programmable logic controller (PLC), a microprocessor or programmable logic device such as a field-programmable gate array (FPGA) or a complex programmable logic device (CPLD). The memory may include a non-volatile memory (e.g., RAM) and/or a volatile memory (e.g., ROM, Flash, etc.). In one embodiment, memory 365 is integrated into processing device 355.

Memory 365 may store firmware 390 for the processing device 355, such as firmware that includes instructions for a remote interface 382. Memory 365 may also store a firmware update 395 that is received from a WAN accessible service to be installed to replace firmware 390 as described above.

Network adapter 360 may be a wired network adapter (e.g., an Ethernet adapter) or a wireless network adapter (e.g., a Wi-Fi® adapter or other wireless local area network (WLAN) adapter). Network adapter 360 may also be configured to provide connection to a network or other devices using Zigbee, PLC, Bluetooth, 6LowPAN, or other communication protocols. Network adapter 360 may receive notifications and other messages from a WAN accessible service and/or remote control applications. Network adapter 360 may additional send outgoing messages to the WAN accessible service and/or to remote control applications.

Remote interface 380 may be executed by processing device 355 to operate on messages and notifications received from a WAN accessible service and/or remote control applications. In some implementations, if device 305 is unable to communicate with a WAN accessible service, communication module 350 of embedded system 315 may operate as an access point (in AP mode) to communicate with the remote control application directly.

Remote interface 380 may also determine if there are sufficient resources to establish a session with the remote control application. For example, remote interface 380 may include sufficient resources to maintain LAN sessions with a particular number of remote control applications in one embodiment. In such an instance, remote interface 380 would determine whether the particular number of remote control applications already have sessions with the embedded system. If so, remote interface would not establish a connection with the new remote control application from which the notification was received. If there were fewer than the particular number of remote control applications with LAN sessions, then remote interface 380 would initiate session establishment.

After a session has been established, remote interface 380 may receive notifications from the remote control application and from any other remote control applications that also have active sessions. Additionally, remote interface 380 may receive notifications from the WAN accessible service. Each of the notifications may indicate that a sender of the notification has a message (e.g., a command or property update) for the embedded system 315. Remote interface 380 may or may not send acknowledgements of receipt of the notifications to senders. Additionally, remote interface 380 may place the notifications into a queue based on an order that they were received, and may process the notifications on a first in first out (FIFO) basis.

When a notification is to be processed, remote interface 382 sends a message to the sender of the notification requesting a message. The remote interface 382 then receives the requested message, decrypts it, and forwards any commands or property updates from the message on to host processing device 325. Host processing device 325 may perform one or more operations based on the commands, which may cause a state of one or more parameters or properties for the device 305 to change. The host processing device 325 may report the changed device state to processing device 355.

In one embodiment, a notification may be a request from a remote control application for device related information in order to determine if a firmware update is available for embedded system 315. Remote interface 380 may retrieve the requested information from device state 340 and return it to the requesting remote control application.

In one embodiment, a notification may be received from a WAN accessible service that a firmware update is available to be retrieved via an OTA update. The notification may include the location of an encrypted digital image stored on the device executing the WAN accessible service (e.g., as further described above with respect to FIG. 2). Remote interface 380 may then notify OTA update manager 370 via API 335 to complete the download of the digital image for the firmware update 395 (and optionally to decrypt the digital image if it was encrypted).

OTA update module 373 may retrieve the digital image from the location specified in the notification, and store it in memory 365 as firmware update 395. In some implementations, firmware update 395 may be downloaded and stored in a single operation. Alternatively, firmware update 395 may be downloaded in pieces, and subsequently stored one piece at a time. For an encrypted digital image of a firmware update, OTA update module 373 may first decrypt the header of the encrypted digital image using the public key 370. OTA update module 373 may then use the single-use key in the header to decrypt the image data for firmware update 395. Subsequently, firmware update 395 may be installed to replace firmware 390.

Remote interface 382 may generate a status update message, and may send it to a connected remote control application and/or to the WAN accessible service if an auto echo mode is enabled. If an auto echo mode is disabled, then the host processing device may determine which, if any, remote control applications and/or WAN accessible services will be notified of the state update, as well as when such updates will be distributed. For example, the host processing device 325 may determine to actively update LAN sessions for every state change and only update the WAN accessible service with latest information once a day. The WAN accessible service may then forward the status update to any remote control applications that are not directly connected to embedded system 315 over the LAN.

Processing device 355 may keep track of every remote control application and WAN accessible service it has an active session with. Reachability to the WAN accessible service may be detected in numerous ways. For example, remote interface 380 may attempt to POST to the WAN accessible service with status updates and/or may attempt to ping the WAN accessible service. If a POST attempt and/or ping attempt fails after one or more retries, processing device 355 may inform host processing device 325 that the WAN accessible service is unreachable. Remote interface 382 may then periodically attempt to reconnect to the WAN accessible service (e.g., every 5 minutes, every 10 minutes, or at some other interval).

In one embodiment, processing device 355 notifies host processing device 325 each time communication module 350 connects to or loses connection with a destination (e.g., with WAN accessible service or a remote control application). The host processing device 325 may use this information to keep track of WAN accessible service reachability and record which property updates/state changes have not been reported to the WAN accessible service in device state 340. Once a connection to the WAN accessible service is reestablished, host processing device 325 or processing device 355 may send all updates that the WAN accessible service missed.

Figure 4:
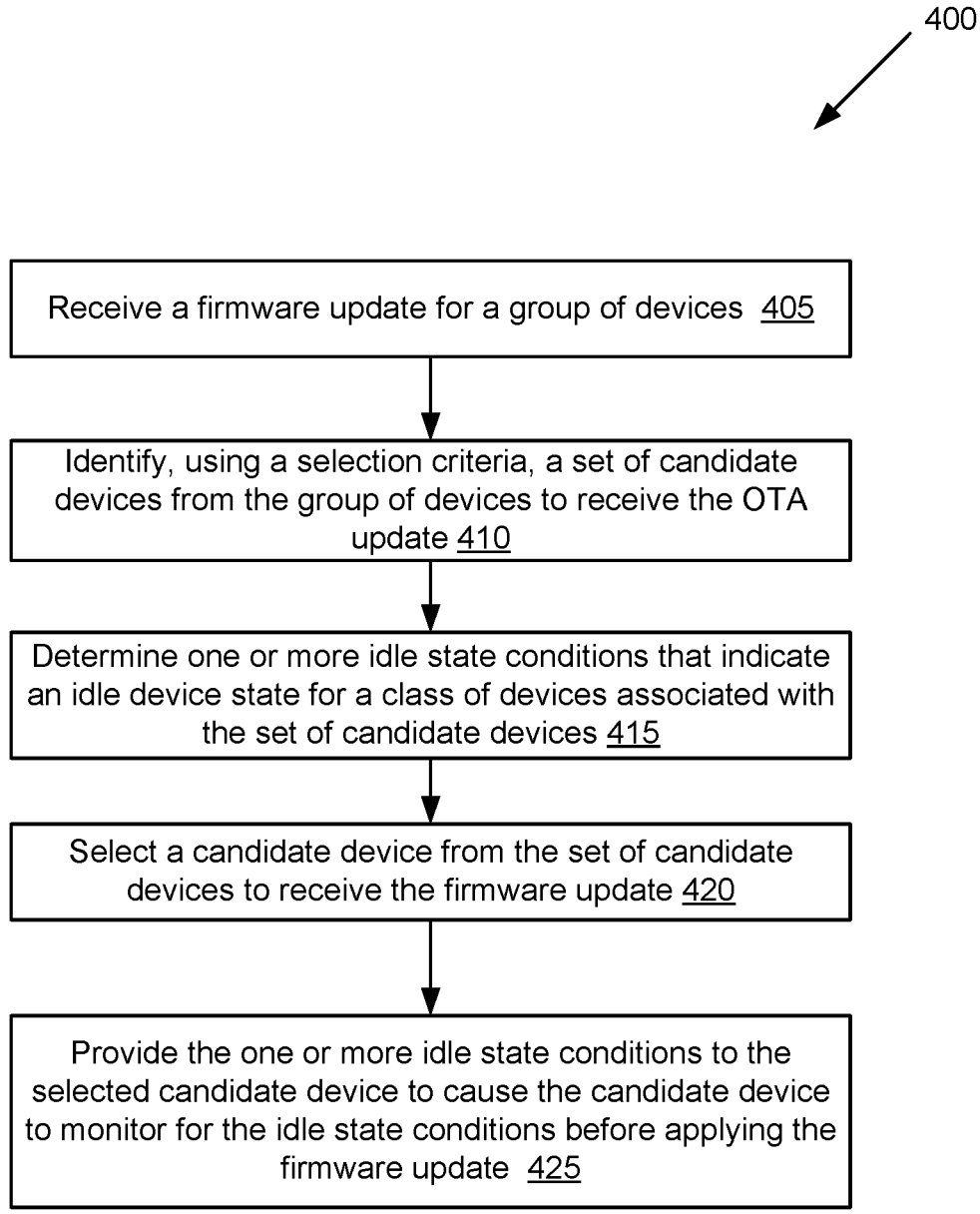
FIG. 4 is a flow chart of an example method for determining idle state conditions by a WAN accessible service.

FIG. 4 is a flow diagram of a method 400 for determining idle state conditions by a WAN accessible service. The method 400 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 400 are performed by WAN accessible service 130 of FIG. 1 and/or WAN accessible service 200 of FIG. 2.

At block 405 of method 400, processing logic receives a firmware update for a group of devices. In some implementations, the firmware update is to be provided to the group of devices by an OTA update. At block 410, processing logic identifies, using a selection criteria, a set of candidate devices from the group of devices to receive the OTA update. In some implementations, the selection criteria comprises one or more device attributes, where the device attributes may include at least one of a device property, a client identifier, a device usage value, a time window, a device location, or a current firmware version.

At block 415, processing logic determines one or more idle state conditions that indicate an idle device state for a class of devices associated with the set of candidate devices identified at block 410. In some implementations, the idle state conditions may include at least one of a time period, a device activity level, a device communication port status, a device component status, or a device embedded system status. At block 420, processing logic selects a candidate device from the set of candidate devices to receive the firmware update. In some implementations, the candidate device is an internet of things (IoT) device that includes an embedded system, where the embedded system monitors for the idle state conditions before applying the OTA firmware update.

At block 425, processing logic provides the one or more idle state conditions to the selected candidate device to cause the candidate device to monitor for the idle state conditions before applying the firmware update. After block 425, the method of FIG. 4 terminates.

Figure 5:
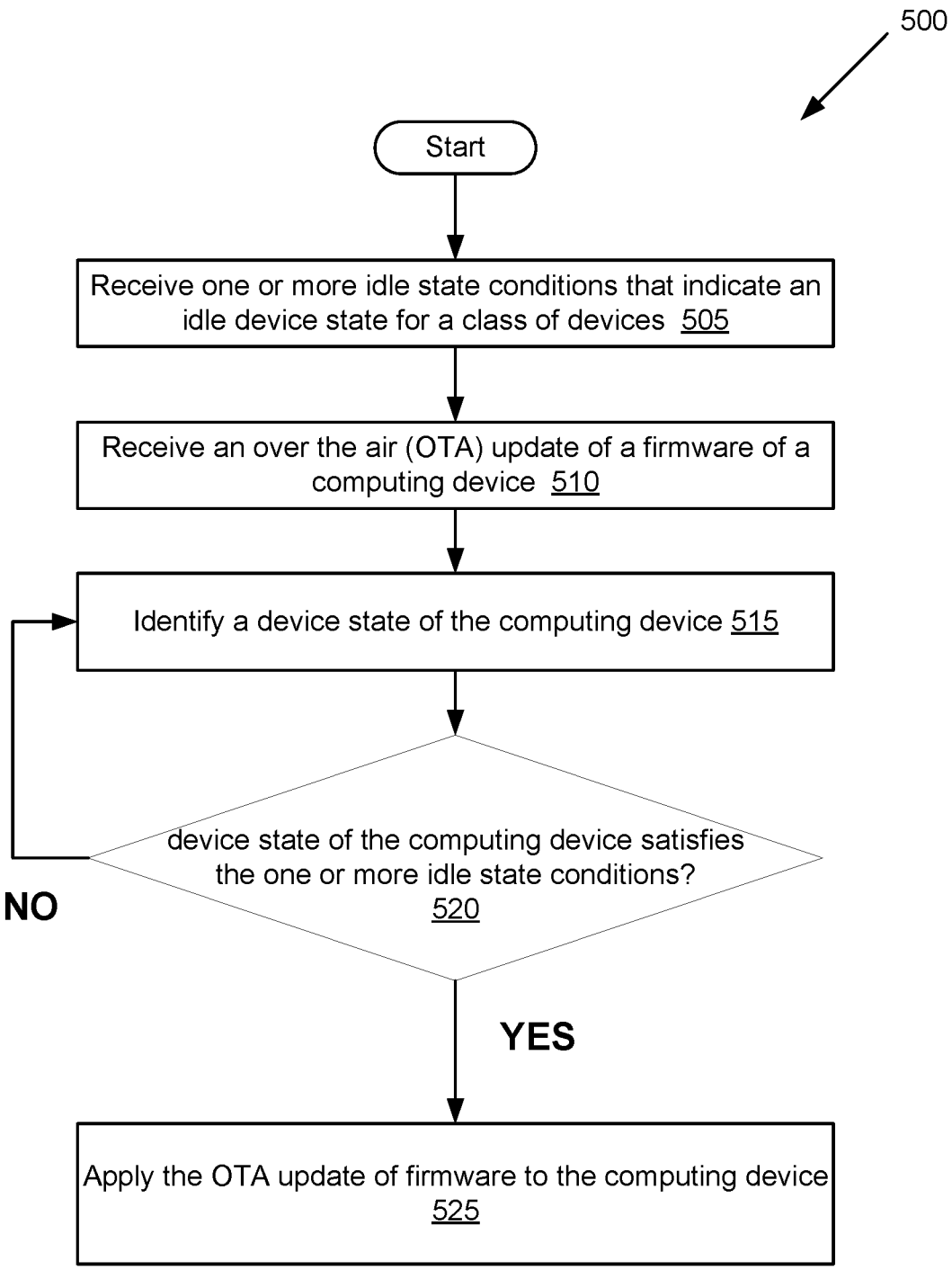
FIG. 5 is a flow chart of an example method for monitoring the device state of a device for idle state conditions.

FIG. 5 is a flow diagrams of a method 500 for monitoring the device state of a device for idle state conditions. The method 500 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 500 are performed by an OTA update manager, such as OTA update manager 151 of FIG. 1 and/or OTA update manager 370 of FIG. 3.

At block 505 of method 500 processing logic receives one or more idle state conditions that indicate an idle device state for a class of devices. In some implementations, the idle state conditions include at least one of a time period, a device activity level, a device communication port status, a device component status, or a device embedded system status. In one embodiment, the idle state conditions may be a set of rules to compare against an observed device state. Alternatively, the idle state conditions may be a simplified machine learning classifier that trained to detect the presence of idle state conditions.

At block 510, processing logic receives an over the air (OTA) update of a firmware of a computing device. In some implementations, the OTA update is to be applied by a computing device responsive to detecting the idle device state of the computing device. In some implementations, the computing device is an internet of things (IoT) device comprising an embedded system. At block 515, processing logic identifies a device state of the computing device. At block 520, processing logic determines whether the device state of the computing device satisfies the one or more idle state conditions. If so, processing proceeds to block 525. In one embodiment, processing logic may make the determination by comparing the rules against the observed device state identified at block 520. Alternatively, processing logic may make this determination by inputting the device state information into the simplified machine learning model (e.g., a classifier). The classifier may then indicate whether or not the computing device is idle.

If at block 520 processing logic determines that the device state of the computing device does not satisfy the idle state conditions, processing returns to block 515 to recheck the device state. In some implementations, processing logic waits until the expiration of a time period before returning to block 515 to recheck the device state. If a certain amount of time passes during which an idle state is not achieved, then processing logic may perform a default operation, which may include proceeding with the firmware update or notifying a WAN accessible service that a firmware update cannot be completed.

At block 525, processing logic applies the OTA update of the firmware to the computing device. After block 525, the method of FIG. 5 terminates.

Figure 6:
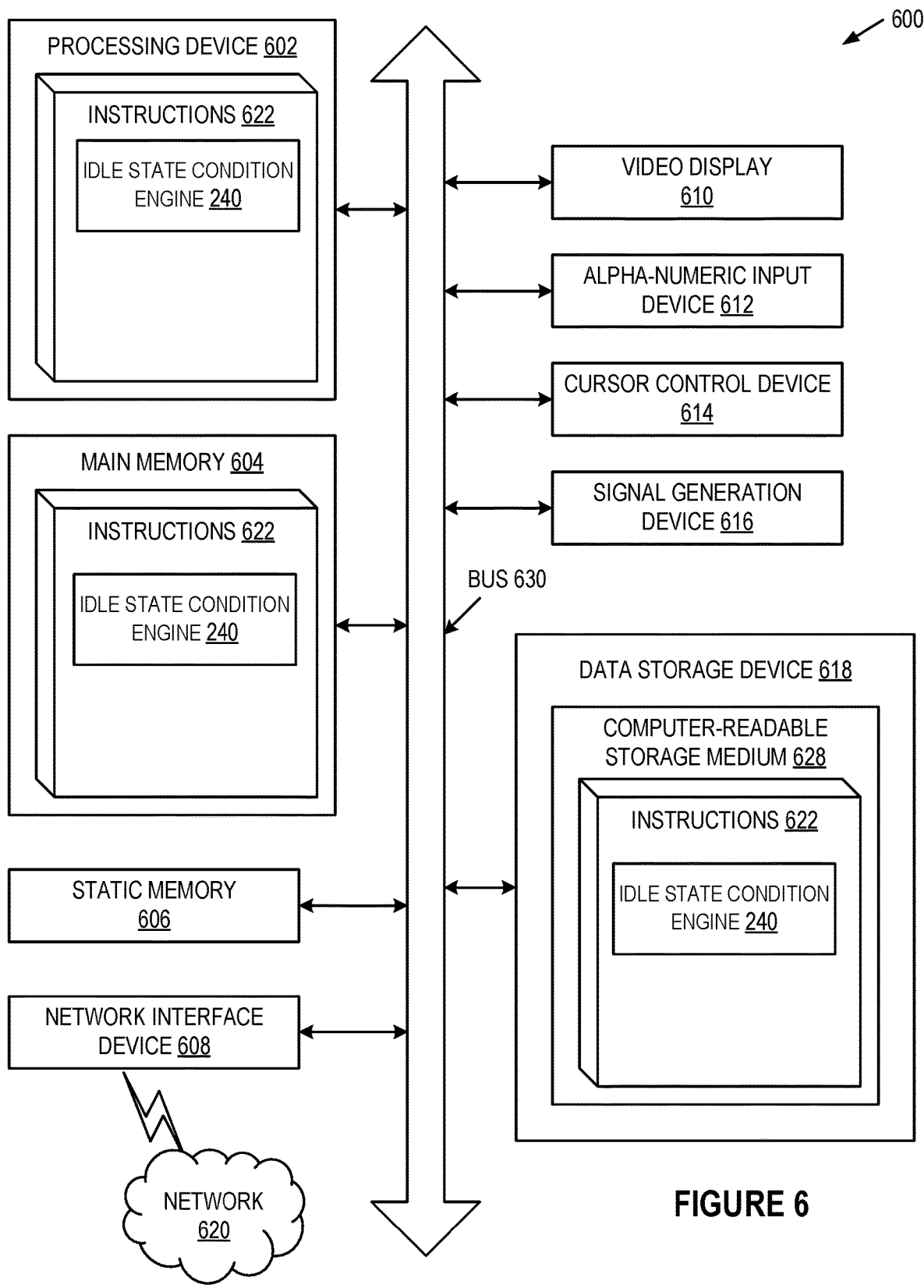
FIG. 6 illustrates a block diagram of one embodiment of a computing device.

FIG. 6 illustrates a diagrammatic representation of a machine in the example form of a computing device 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium (or more specifically a computer-readable storage medium) 628 on which is stored one or more sets of instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable storage media.

The computer-readable storage medium 628 may also be used to store an idle state condition engine 240 (as described with reference to FIG. 2), and/or a software library containing methods that call an idle state condition engine 240. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-3) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "determining", "selecting", "providing", "storing", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device executing a wide area network (WAN) accessible service, a firmware update for a plurality of devices, wherein the firmware update is to be provided to the plurality of devices by an over the air (OTA) update;
   identifying, using a selection criteria, a set of candidate devices from the plurality of devices to receive the OTA update, wherein the selection criteria comprises one or more device attributes;
   determining a status check time interval based on historical usage patterns associated with the set of candidate devices;
   determining, by the processing device executing the WAN accessible service, one or more idle state conditions that indicate an idle device state for a class of devices associated with the set of candidate devices, wherein the one or more idle state conditions comprises the status check time interval;
   selecting a candidate device from the set of candidate devices to receive the firmware update; and
   providing, to the selected candidate device, the one or more idle state conditions and the firmware update, to cause the candidate device to monitor, using a machine learning classifier, for the idle state conditions before applying the firmware update, wherein the one or more idle state conditions are associated with an expiration time period associated with applying the firmware update regardless of the idle state conditions of the selected candidate device.

2. The method of claim 1, wherein the one or more device attributes comprise at least one of a device property, a client identifier, a device usage value, a time window, a device location, or a current firmware version.

3. The method of claim 1, wherein determining the one or more idle state conditions further comprises:
   receiving the one or more idle state conditions from a user interface of a management console.

4. The method of claim 1, wherein determining the one or more idle state conditions further comprises:
   performing clustering on historical data of device state activity associated with the plurality of devices to divide the historical data into a first subset indicative of an idle state and a second subset indicative of an active state;
   determining one or more idle state conditions for the first subset and one or more active state conditions for the second subset; and
   generating a machine learning model trained to classify between the idle state and the active state.

5. The method of claim 1, wherein the one or more idle state conditions comprise at least one of a time period, a device activity level, a device communication port status, a device component status, or a device embedded system status.

6. The method of claim 1, wherein the candidate device is an internet of things (IoT) device comprising an embedded system, and wherein the embedded system monitors for the idle state conditions before applying the firmware update.

7. The method of claim 1, wherein providing the one or more idle state conditions to the selected candidate device further comprises:
sending a notification to the selected candidate device to cause the selected candidate device to retrieve the idle state conditions and the firmware update from the WAN accessible service.

8. A method comprising:
receiving, by a computing device, one or more idle state conditions that indicate an idle device state for a class of devices associated with the computing device and an over the air (OTA) update of a firmware of the computing device, wherein the OTA update is to be applied by the computing device responsive to detecting the idle device state of the computing device;
determining, based on historical activity information stored on the computing device, a status check time interval;
identifying, at expiration of the status check time interval, a first device state of the computing device;
determining, using a trained machine learning model executed by the computing device, whether the first device state of the computing device satisfies the one or more idle state conditions associated with applying the OTA update of the firmware to the computing device;
responsive to determining that the first device state of the computing device satisfies the one or more idle state conditions, applying, by the computing device, the OTA update of the firmware to the computing device; and
responsive to determining that the first device state of the computing device fails to satisfy the one or more idle state conditions:
identifying a current device state of the computing device at expiration of an expiration time period associated with the one or more idle state conditions; and
responsive to determining that the current device state of the computing device does not satisfy the one or more idle state conditions, applying, by the computing device, the OTA update of the firmware to the computing device.

9. The method of claim 8, wherein the first device state of the computing device is identified at a first time, the method further comprising:
determining that a second device state of the computing device does not satisfy the one or more idle state conditions at a second time that occurs before the first time; and
waiting for expiration of the status check time interval before identifying the first device state at the first time.

10. The method of claim 9, further comprising:
receiving the status check time interval from a wide area network (WAN) accessible service.

11. The method of claim 9, further comprising:
analyzing the historical activity information stored on the computing device to identify one or more time periods of activity for the computing device; and
determining the status check time interval in view of the one or more time periods of activity.

12. The method of claim 8, wherein applying the OTA update further comprises:
saving the first device state of the computing device to a saved state;
determining a completion status of the OTA update of the firmware; and
sending, to a wide area network (WAN) accessible service, a notification that indicates the completion status of the OTA update of the firmware for the computing device.

13. The method of claim 12, further comprising:
detecting a failure to apply the OTA update of the firmware;
restoring the first device state of the computing device to the saved state;
identifying a device state condition that caused the failure;
determining that the device state condition that cause the failure has ceased; and
reapplying the OTA update of the firmware.

14. The method of claim 8, further comprising:
responsive to determining that the first device state of the computing device does not satisfy the one or more idle state conditions, starting a timer that expires at the expiration of the expiration time period; and
responsive to determining that the timer has expired, determining the expiration of the expiration time period.

15. The method of claim 8, wherein the one or more idle state conditions are associated with a second expiration time period, the method further comprising:
responsive to determining that the first device state of the computing device does not satisfy the one or more idle state conditions, starting a timer that expires at an end of the second expiration time period;
determining that the timer has expired;
identifying a second current device state of the computing device; and
determining that the second current device state of the computing device does not satisfy the one or more idle state conditions;
deleting the OTA update of the firmware from a memory of the computing device; and
sending, to a wide area network (WAN) accessible service, a notification to indicate that the OTA update of the firmware has failed.

16. The method of claim 8, wherein the one or more idle state conditions comprise at least one of a time period, a device activity level, a device communication port status, a device component status, or a device embedded system status.

17. The method of claim 8, wherein the computing device is an internet of things (IoT) device comprising an embedded system.

18. The method of claim 8, further comprising:
storing the OTA update of the firmware in a memory of the computing device.

19. The method of claim 8, further comprising:
receiving a notification from a WAN accessible service that indicates that the OTA update of the firmware is available for the computing device;
retrieving the OTA update from the WAN accessible service;
retrieving the one or more idle state conditions from the WAN accessible service; and
storing the OTA update and the one or more idle state conditions in a memory of the computing device.

20. A system comprising:
a computing device comprising:
a memory; and
a processing device operatively coupled to the memory, the processing device to:

receive one or more idle state conditions that indicate an idle device state for a class of devices associated with the computing device and an over the air (OTA) update of a firmware of the computing device, wherein the OTA update is to be applied by the computing device responsive to detecting the idle device state of the computing device;

determine, based on historical activity information stored on the computing device, a status check time interval;

identify, at expiration of the status check time interval, a first device state of the computing device;

determine, using a trained machine learning model executed by the computing device, whether the first device state of the computing device satisfies the one or more idle state conditions associated with applying the OTA update of the firmware to the computing device;

responsive to determining that the first device state of the computing device satisfies the one or more idle state conditions, apply the OTA update of the firmware to the computing device; and responsive to determining that the first device state of the computing device does not satisfy the one or more idle state conditions:

identify a current device state of the computing device at expiration of an expiration time period associated with the one or more idle state conditions; and responsive to determining that the current device state of the computing device does not satisfy the one or more idle state conditions, apply the OTA update of the firmware to the computing device.

21. The system of claim 20, further comprising:

a server computing device comprising:

a second memory; and a second processing device operatively coupled to the second memory, the second processing device to execute a WAN accessible service to:

receive a second firmware update for a plurality of devices, wherein the firmware update is to be provided to the plurality of devices by a second over the air (OTA) update;

identify, using a selection criteria, a set of candidate devices from the plurality of devices to receive the second OTA update, wherein the selection criteria comprises one or more device attributes;

determine one or more second idle state conditions that indicate a second idle device state for a second class of devices associated with the set of candidate devices;

selecting a candidate device from the set of candidate devices to receive the firmware update; and providing the one or more second idle state conditions to the selected candidate device to cause the candidate device to monitor for the second idle state conditions before applying the second firmware update.

* * * * *